United States Patent
Kim et al.

(10) Patent No.: US 11,225,045 B2
(45) Date of Patent: Jan. 18, 2022

(54) DECORATIVE MEMBER AND METHOD FOR PREPARING SAME

(71) Applicant: LG CHEM, LTD., Seoul (KR)

(72) Inventors: Yong Chan Kim, Daejeon (KR); Jeong Woo Shon, Daejeon (KR); Pilsung Jo, Daejeon (KR); Ki Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 167 days.

(21) Appl. No.: 16/615,735

(22) PCT Filed: Jun. 26, 2018

(86) PCT No.: PCT/KR2018/007225
§ 371 (c)(1),
(2) Date: Nov. 21, 2019

(87) PCT Pub. No.: WO2019/004698
PCT Pub. Date: Jan. 3, 2019

(65) Prior Publication Data
US 2020/0355974 A1    Nov. 12, 2020

(30) Foreign Application Priority Data
Jun. 27, 2017 (KR) .................. 10-2017-0081401
Oct. 20, 2017 (KR) .................. 10-2017-0136808

(51) Int. Cl.
*B32B 3/00* (2006.01)
*B32B 3/26* (2006.01)
(Continued)

(52) U.S. Cl.
CPC ............... *B32B 3/263* (2013.01); *B32B 3/30* (2013.01); *B32B 7/12* (2013.01); *B32B 15/09* (2013.01); *B32B 15/20* (2013.01); *B32B 17/10* (2013.01); *B44F 1/02* (2013.01); *B44F 1/08* (2013.01); *G02F 1/133553* (2013.01); *G02F 1/153* (2013.01); *G02F 1/155* (2013.01);
(Continued)

(58) Field of Classification Search
CPC ........... B32B 3/30; B32B 3/263; B32B 15/09; B32B 15/20; B44F 1/02; B44F 1/08
See application file for complete search history.

(56) References Cited

U.S. PATENT DOCUMENTS 6,344,288 B1   2/2002 Oyama et al.
7,142,190 B2  11/2006 Martinez
(Continued)

FOREIGN PATENT DOCUMENTS

CN   102971862 A   3/2013
CN   104423114 A   3/2015
(Continued)

OTHER PUBLICATIONS

Mokrzycki, et al. 2011. Color difference Delta E-A survey. Machine Graphics and Vision.

*Primary Examiner* — Elizabeth E Mulvaney
(74) *Attorney, Agent, or Firm* — Dentons US LLP

(57) ABSTRACT

The present disclosure relates to a decoration element comprising a color developing layer comprising a light reflective layer, and a light absorbing layer provided on the light reflective layer; and an electrochromic device provided on one surface of the color developing layer.

14 Claims, 16 Drawing Sheets

(51) Int. Cl.
  *B32B 3/30* (2006.01)
  *B32B 7/12* (2006.01)
  *B32B 15/09* (2006.01)
  *B32B 15/20* (2006.01)
  *B44F 1/02* (2006.01)
  *B44F 1/08* (2006.01)
  *G02F 1/1335* (2006.01)
  *G02F 1/155* (2006.01)
  *G02F 1/157* (2006.01)
  *B32B 17/10* (2006.01)
  *G02F 1/153* (2006.01)

(52) U.S. Cl.
  CPC .......... *G02F 1/157* (2013.01); *B32B 2255/10* (2013.01); *B32B 2307/4026* (2013.01); *B32B 2307/416* (2013.01); *B32B 2451/00* (2013.01)

(56) References Cited

U.S. PATENT DOCUMENTS

| | | | |
|---|---|---|---|
| 8,816,932 | B2 | 8/2014 | Kawaguchi et al. |
| 8,889,570 | B2 | 11/2014 | Matsumura et al. |
| 9,187,820 | B2 | 11/2015 | Kawaguchi et al. |
| 2005/0153107 | A1 | 7/2005 | Iijima |
| 2005/0233133 | A1 | 10/2005 | Tamai et al. |
| 2006/0098264 | A1 | 5/2006 | Park |
| 2011/0262713 | A1 | 10/2011 | Nakao et al. |
| 2013/0048072 | A1 | 2/2013 | Choi |
| 2013/0229598 | A1 | 9/2013 | Kamada |
| 2015/0212244 | A1 | 7/2015 | Kim et al. |
| 2017/0235203 | A1 | 8/2017 | Yamamoto et al. |
| 2020/0165161 | A1* | 5/2020 | Berlinguette ........... C03C 17/25 |

FOREIGN PATENT DOCUMENTS

| | | |
|---|---|---|
| EP | 1465962 A1 | 10/2004 |
| JP | 2001-332130 A | 11/2001 |
| JP | 2005-519462 A | 6/2005 |
| JP | 2008-500560 A | 1/2008 |
| JP | 2008-507000 A | 3/2008 |
| JP | 2008-83599 A | 4/2008 |
| JP | 2009-90638 A | 4/2009 |
| JP | 2010-173273 A | 8/2010 |
| JP | 2010-188713 A | 9/2010 |
| JP | 2010-197798 A | 9/2010 |
| JP | 2011-251521 A | 12/2011 |
| JP | 5016722 B2 | 9/2012 |
| JP | 2014-174327 A | 9/2014 |
| JP | 2015-533678 A | 11/2015 |
| JP | 2016-045464 A | 4/2016 |
| KR | 2002-0060633 A | 7/2002 |
| KR | 0387775 | 6/2005 |
| KR | 10-0563419 B1 | 3/2006 |
| KR | 10-2009-0128490 A | 12/2009 |
| KR | 10-2011-0019899 A | 3/2011 |
| KR | 10-2014-0111813 A | 9/2014 |
| KR | 10-2015-0062404 A | 6/2015 |
| KR | 2015-0136177 A | 12/2015 |
| WO | 03046106 A1 | 6/2003 |
| WO | 2015-032200 A1 | 3/2015 |
| WO | 2018/199568 A1 | 11/2018 |

* cited by examiner

[FIG. 1]
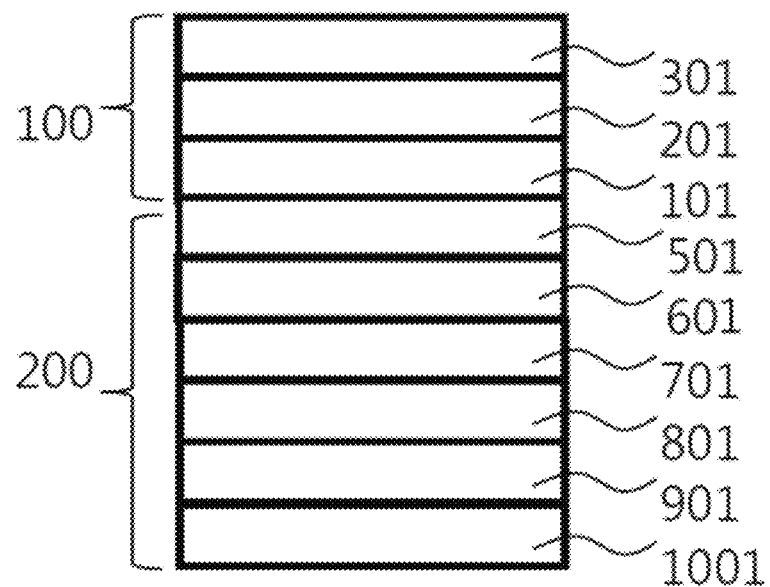
[FIG. 2]
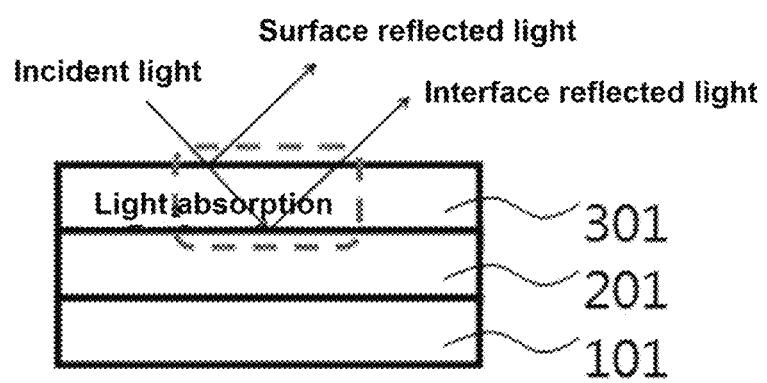

[FIG. 3]
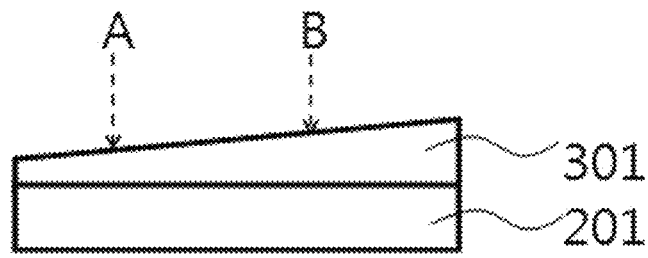
[FIG. 4]
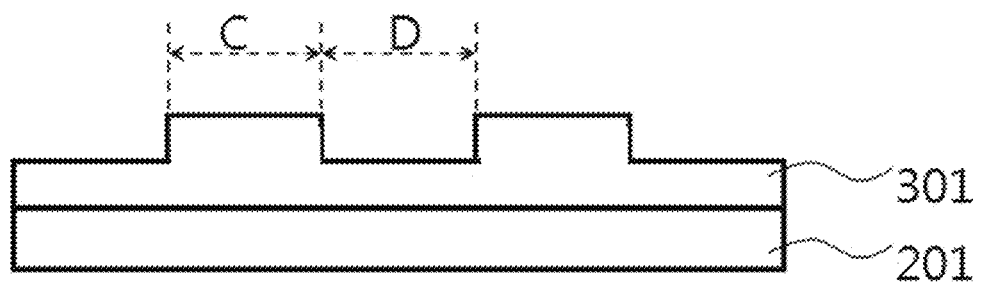
[FIG. 5]
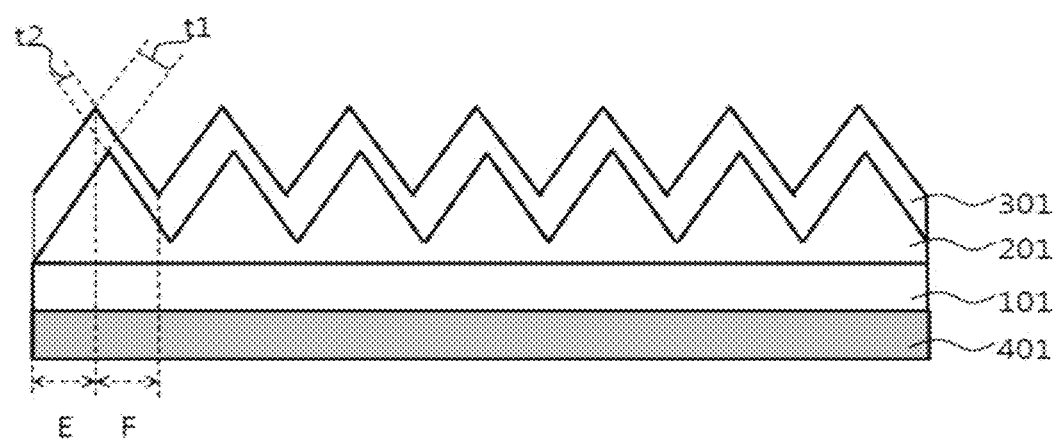

[FIG. 6]
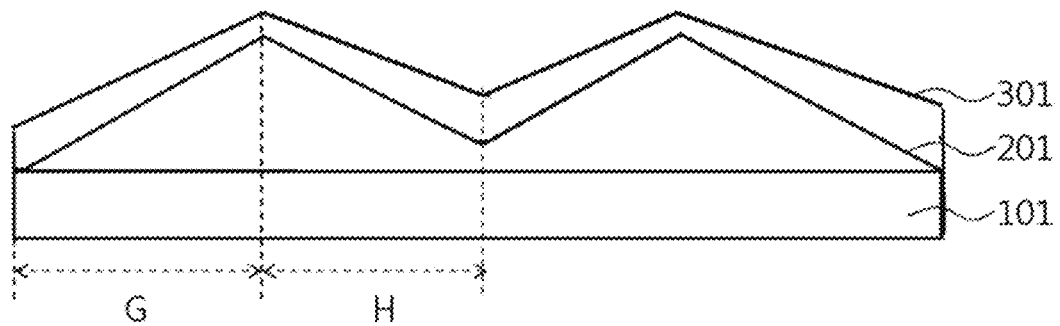
[FIG. 7]
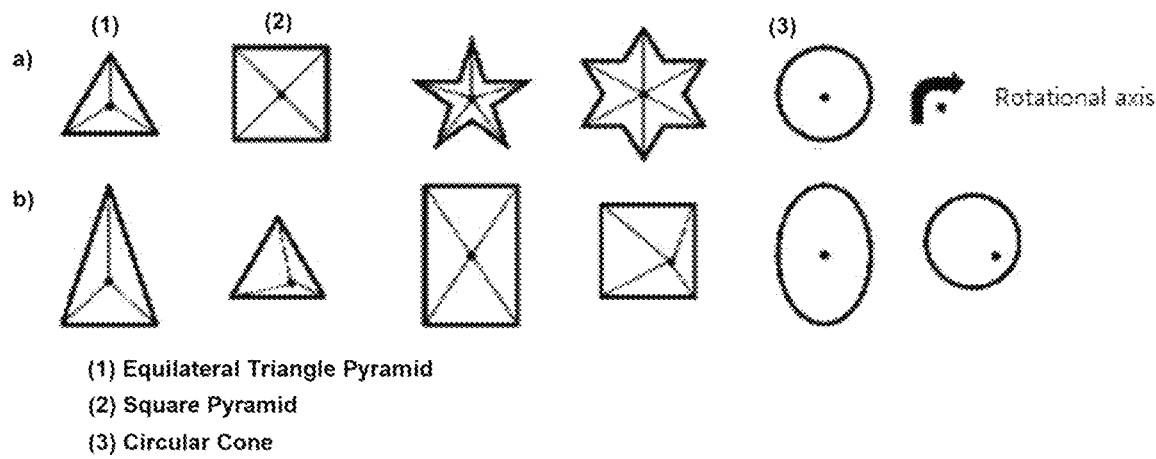
(1) Equilateral Triangle Pyramid
(2) Square Pyramid
(3) Circular Cone
[FIG. 8]
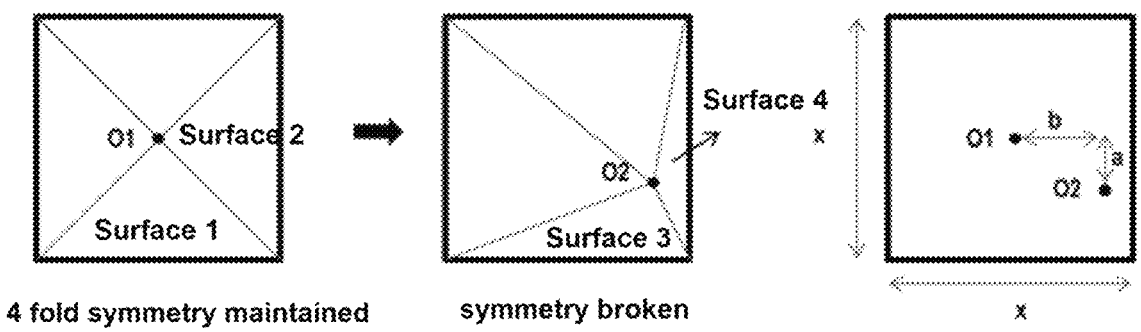

[FIG. 9]
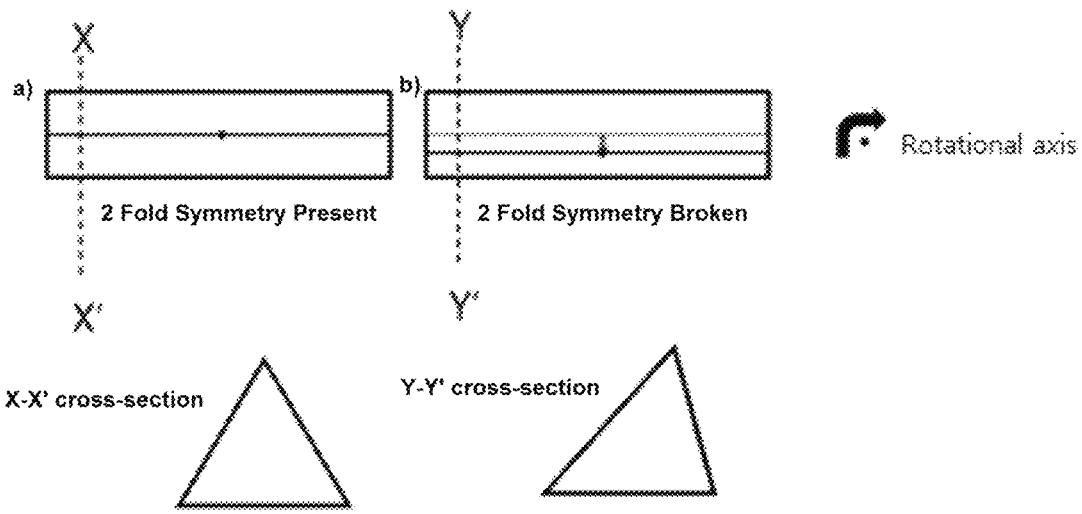
[FIG. 10]
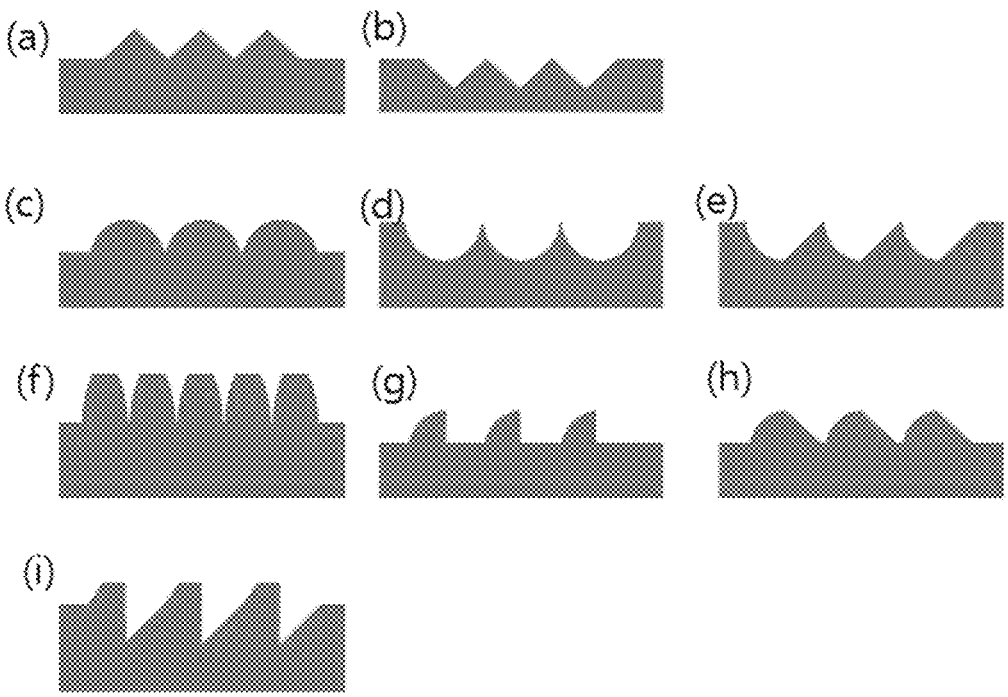

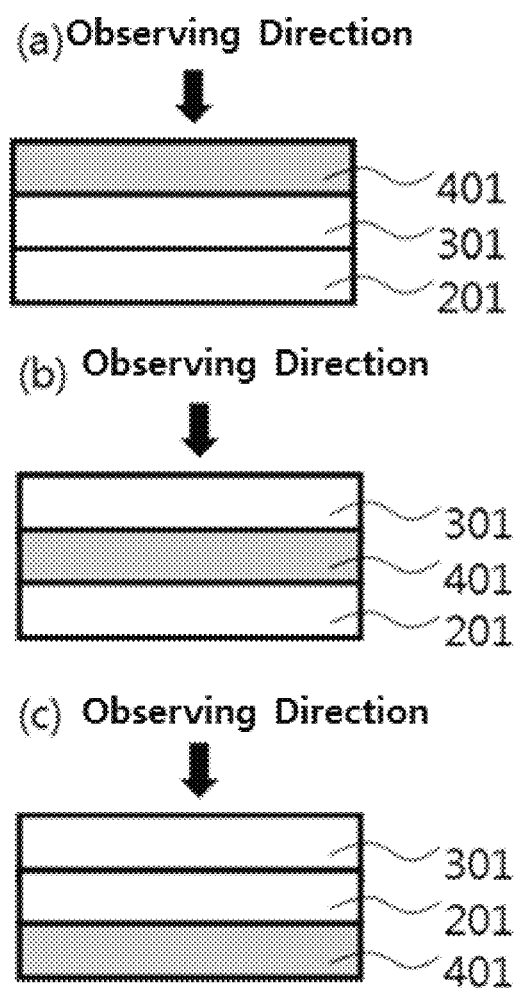
[FIG. 11]

[FIG. 12]
(a) Observing Direction
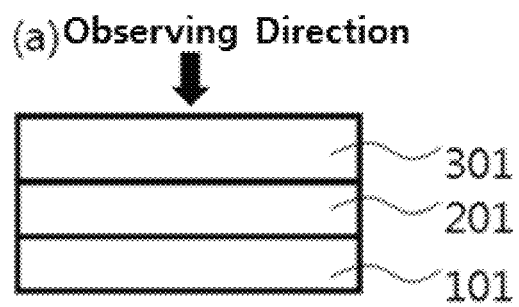
(b) Observing Direction
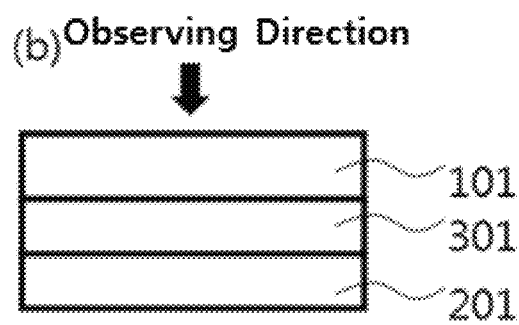

[FIG. 13]
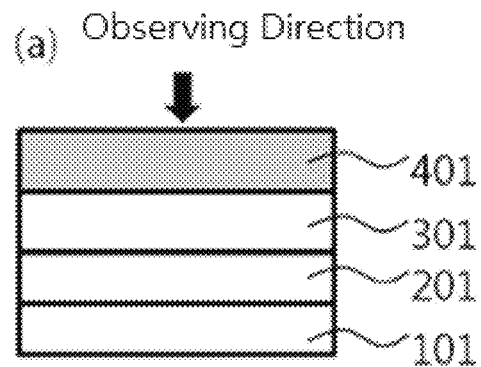
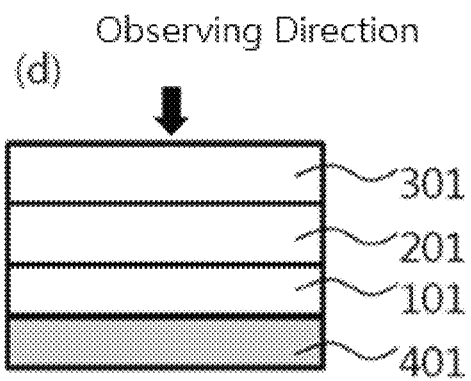
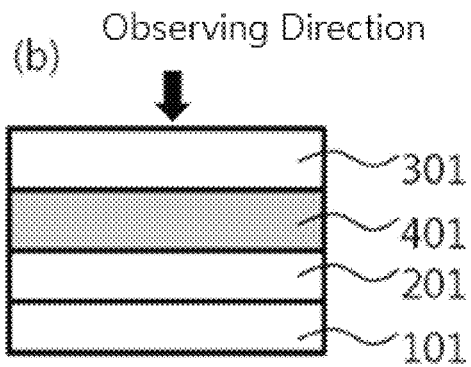
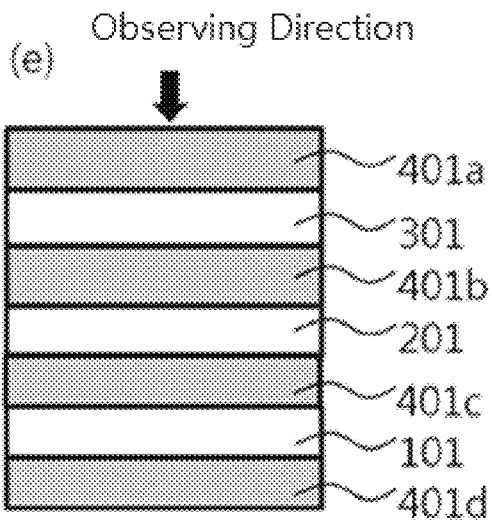
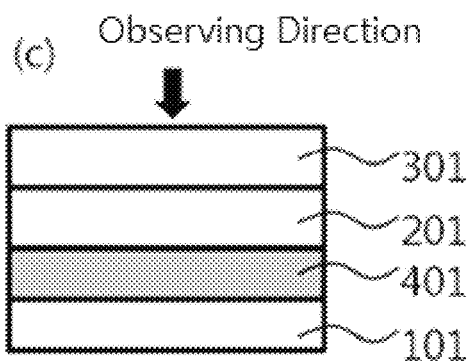

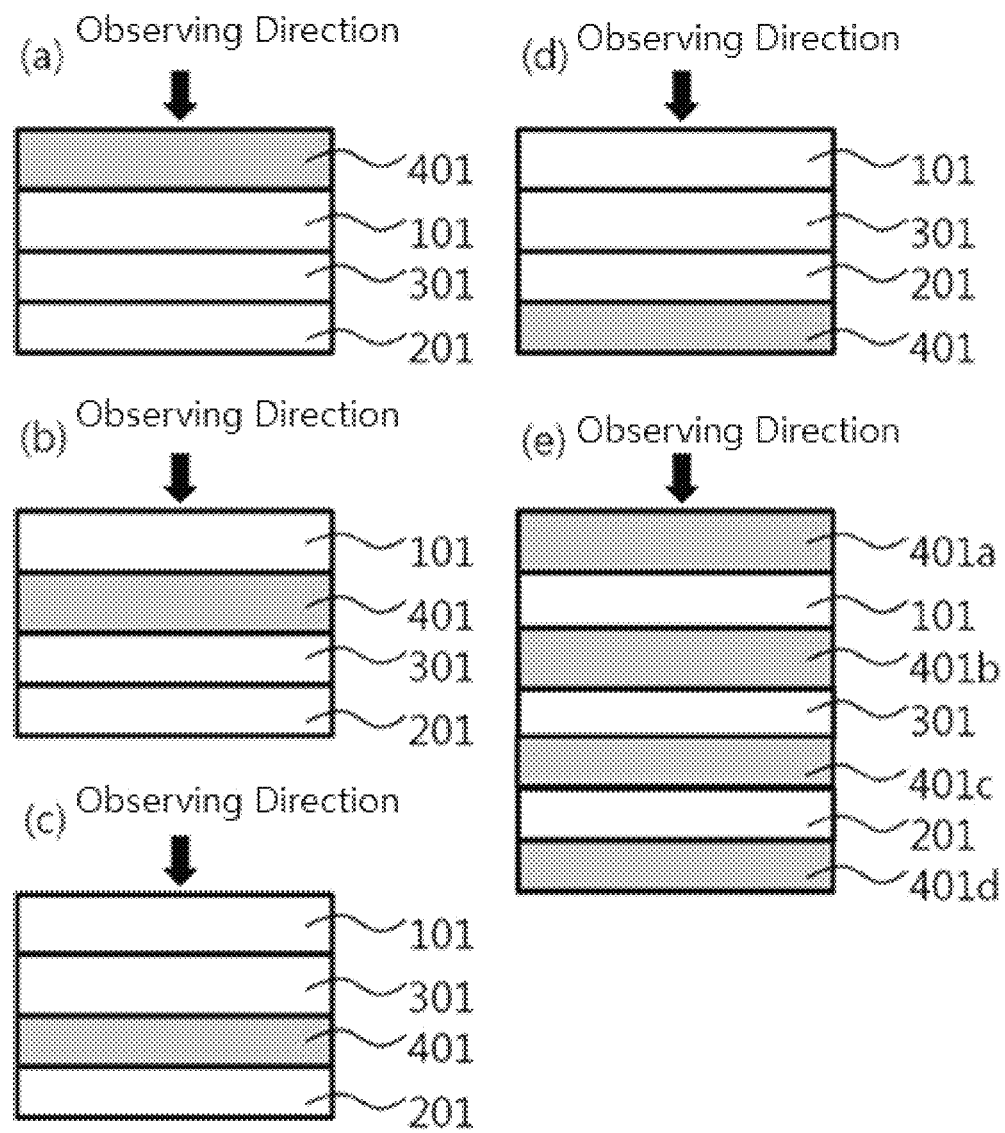
[FIG. 14]

[FIG. 15]
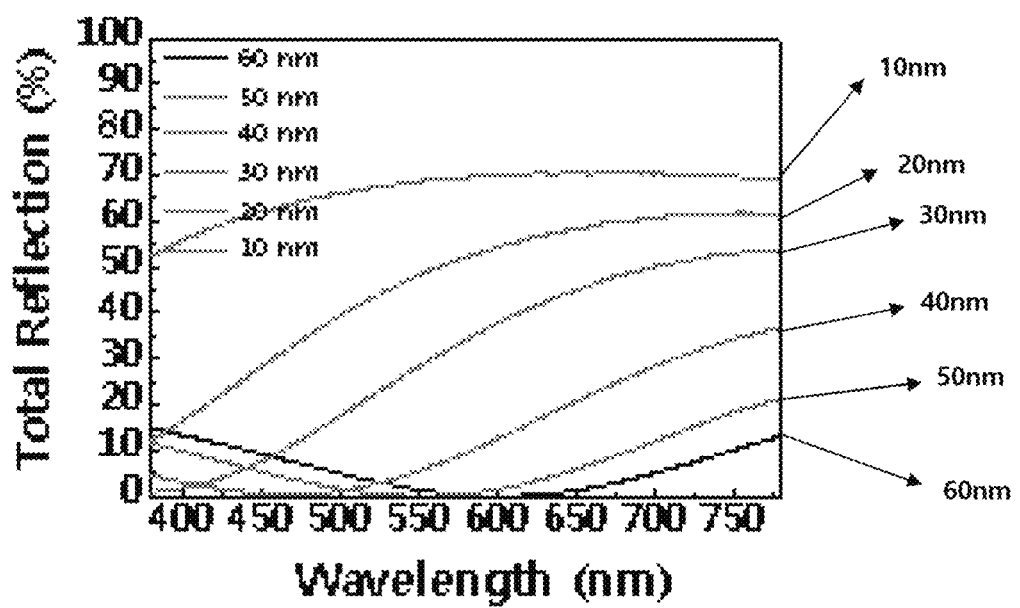

[FIG. 16]
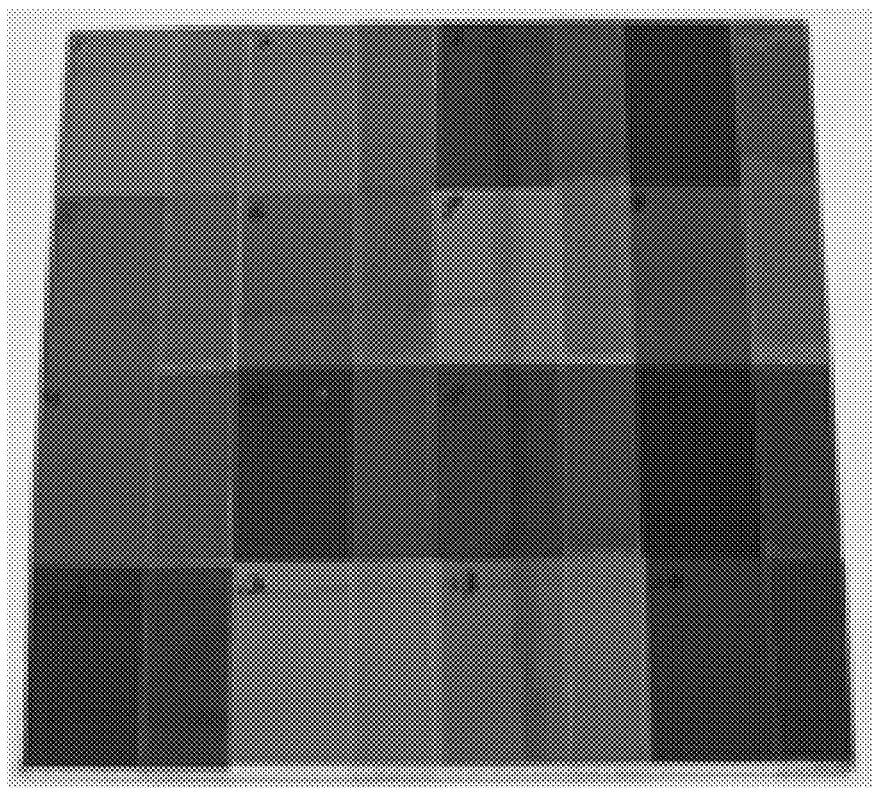

[FIG. 17]
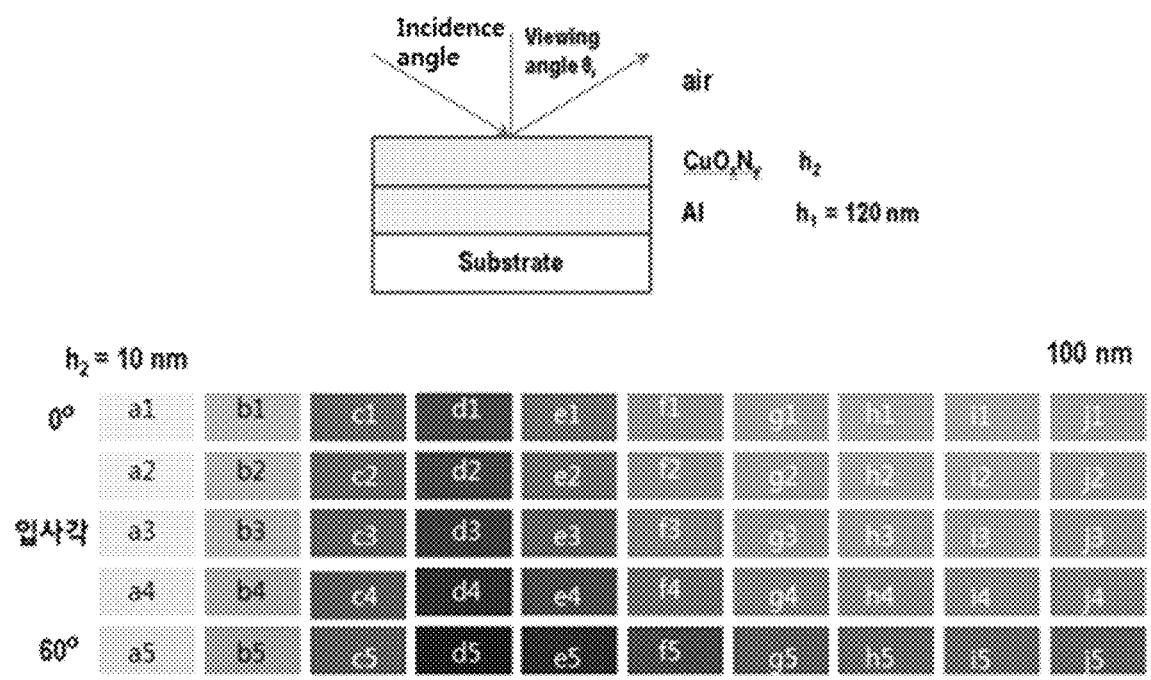

[FIG. 18]
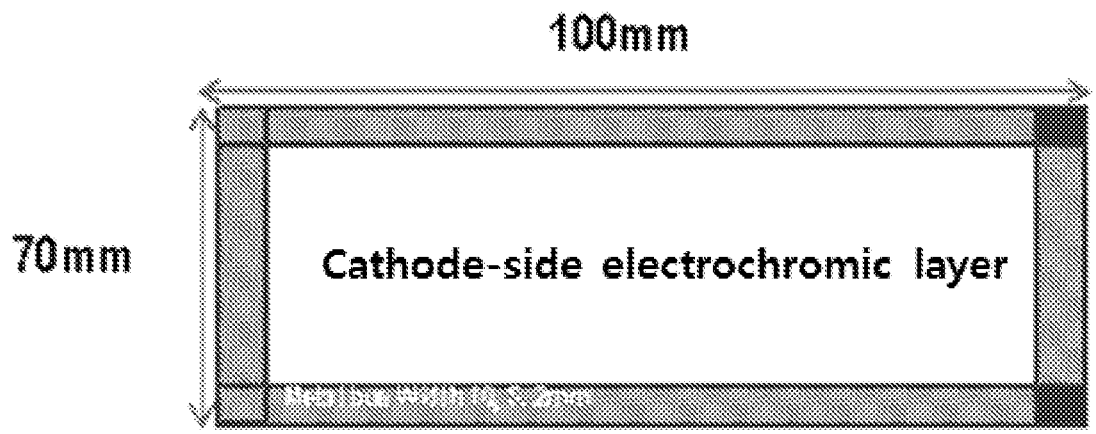
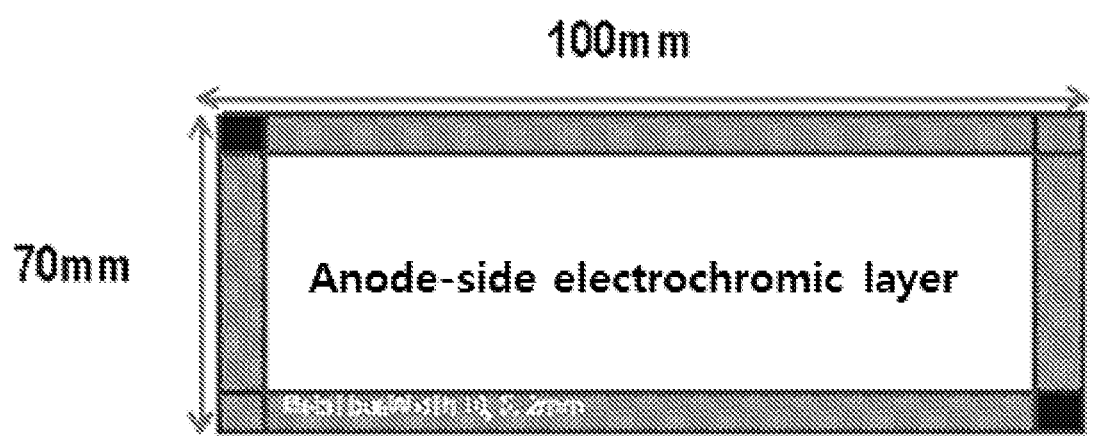

[FIG. 19]
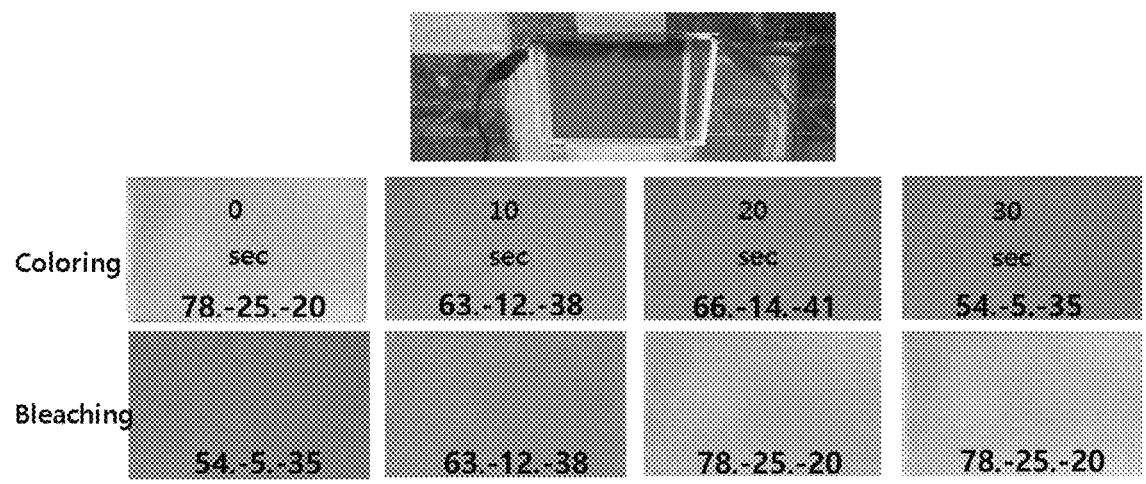

[FIG. 20]
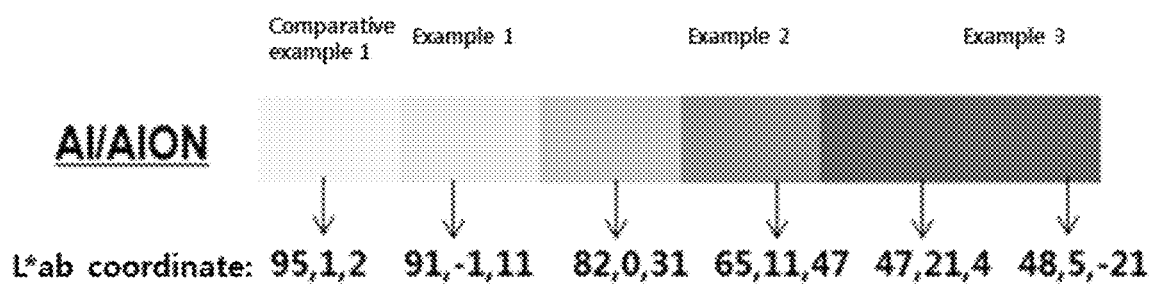
[FIG. 21]
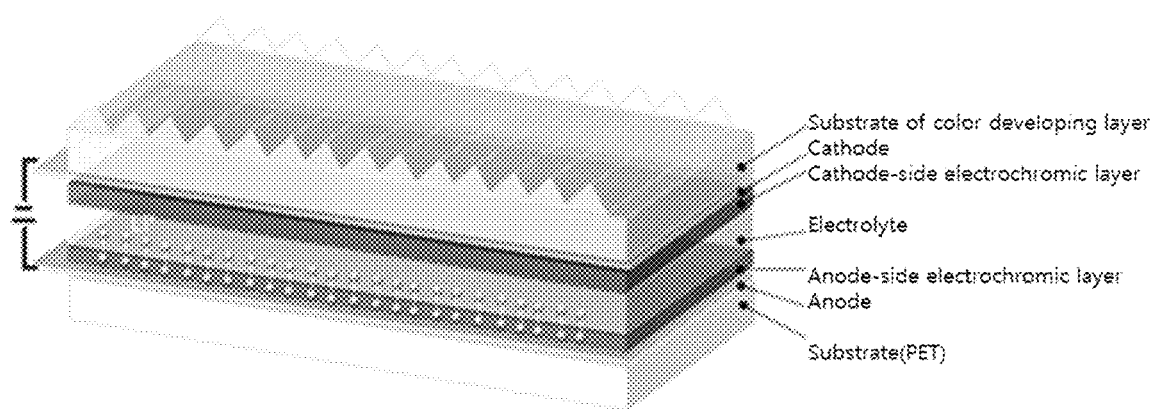

[FIG. 22]
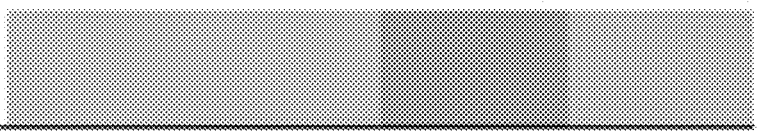
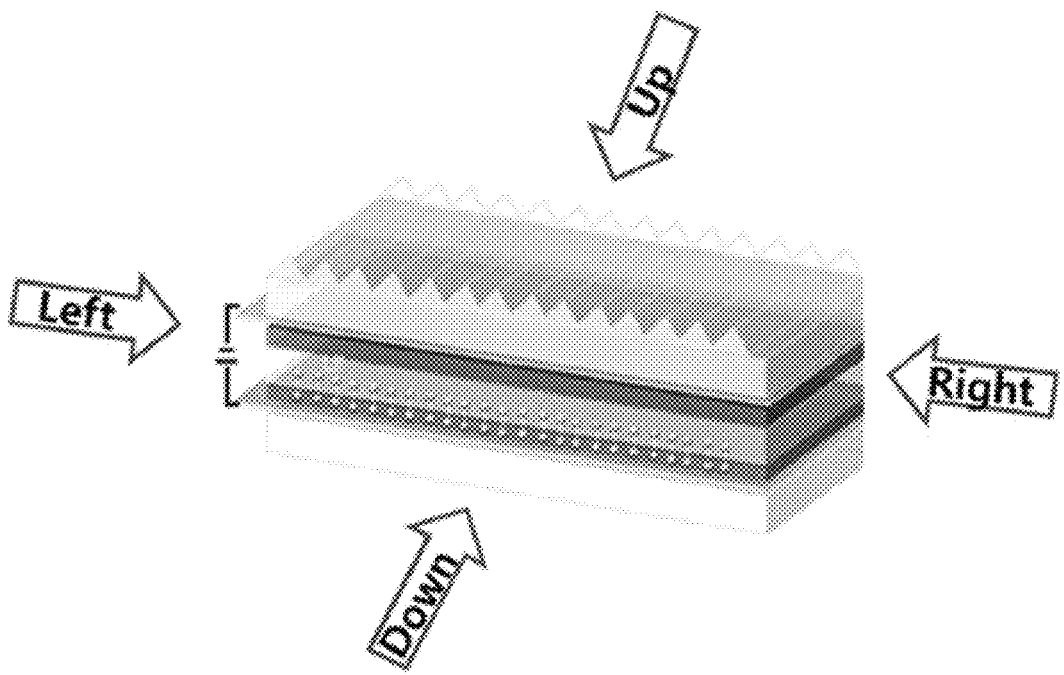

[FIG. 23]
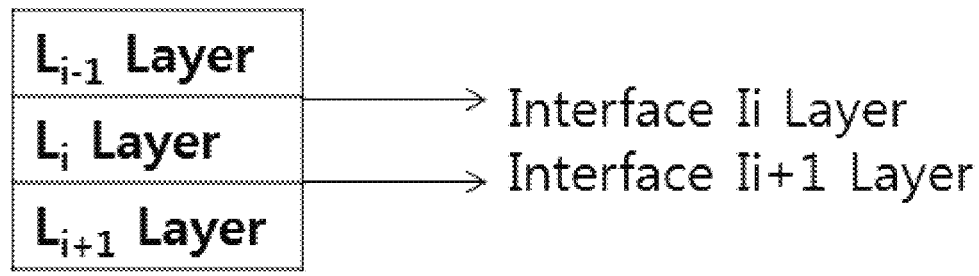

DECORATIVE MEMBER AND METHOD FOR PREPARING SAME

The present application is a Nation Phase entry of PCT/KR2018/007225 filed Jun. 26, 2018, and claims priority to and the benefits of Korean Patent Application No. 10-2017-0081401, filed with the Korean Intellectual Property Office on Jun. 27, 2017, and Korean Patent Application No. 10-2017-0136808, filed with the Korean Intellectual Property Office on Oct. 20, 2017, the entire contents of which are incorporated herein by reference in their entirety.

FIELD

The present disclosure relates to, for example, a decoration element and a method for preparing the same. In particular, the present disclosure relates to a decoration element suitable to be used in mobile devices or electronic products, and a method for preparing the same.

BACKGROUND

For mobile phones, various mobile devices and electronic products, product designs such as colors, shapes and patterns play a major role in providing value of products to customers in addition to product functions. Product preferences and prices are also dependent on designs.

As for mobile phones as one example, various colors and color senses are obtained using various methods, and used in products. A method of providing colors to a mobile phone case material itself or a method of providing designs by attaching a deco film imparting colors and shapes to a case material may be included.

In existing deco films, attempts have been made to develop colors through methods such as printing and deposition. When expressing heterogeneous colors on a single surface, printing needs to be conducted two or more times, and implementation is hardly realistic when applying various colors to a three-dimensional pattern. In addition, existing deco films have fixed colors depending on viewing angle, and even when there is a slight change, the change is limited to just a difference in the color sense.

SUMMARY

The present disclosure is directed to providing a decoration element capable of readily obtaining various colors, capable of obtaining a number of colors on a three-dimensional pattern, as necessary, and capable of providing color changes depending on a viewing angle.

One embodiment of the present application provides a decoration element comprising a color developing layer comprising a light reflective layer, and a light absorbing layer provided on the light reflective layer; and an electrochromic device provided on one surface of the color developing layer.

According to another embodiment of the present application, the color developing layer further comprises a color film provided on a surface of the light reflective layer opposite to the surface facing the light absorbing layer, between the light reflective layer and the light absorbing layer, or on a surface of the light absorbing layer opposite to the surface facing the light reflective layer.

According to another embodiment of the present application, the color film employs a color difference $\Delta E^*ab$, a distance in space of $L^*a^*b^*$ in a color coordinate CIE $L^*a^*b^*$ of the color developing layer, to be greater than 1 when the color film is present, compared to when the color film is not provided.

According to another embodiment of the present application, a substrate is provided on a surface of the light reflective layer opposite to the surface facing the light absorbing layer, or on a surface of the light absorbing layer opposite to the surface facing the light reflective layer. The substrate may be provided on a surface of the light reflective layer opposite to the surface facing the light absorbing layer, and the color film may be provided between the substrate and the light reflective layer, or on a surface of the substrate opposite to the surface facing the light reflective layer. The substrate may be provided on a surface of the light absorbing layer opposite to the surface facing the light reflective layer, and the color film may be provided between the substrate and the light absorbing layer, or on a surface of the substrate of the substrate opposite to the surface facing the light absorbing layer.

According to another embodiment of the present application, the light absorbing layer comprises two or more points with different thicknesses.

According to another embodiment of the present application, the light absorbing layer comprises two or more regions with different thicknesses.

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

According to another embodiment of the present application, the light absorbing layer comprises one or more regions with a gradually changing thickness.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes.

According to another embodiment of the present application, the light absorbing layer has an extinction coefficient (k) value of greater than 0 and less than or equal to 4, preferably 0.01 to 4, at a wavelength of 400 nm.

According to another embodiment of the present application, the decoration element is a deco film, a case of a mobile device, a case of an electronic product, or a commodity requiring color decoration.

According to embodiments described in the present specification, light absorption occurs in each entering path when external light enters through a color developing layer and in a reflection path when reflected. Since external light is reflected on each of a light absorbing layer surface and a light reflective layer surface, constructive interference and destructive interference phenomena occur between reflected light on the light absorbing layer surface and reflected light on the light reflective layer surface. Specific colors may be developed through such light absorption in the entering path and the reflection path, and the constructive interference and destructive interference phenomena. Accordingly, specific colors may be obtained according to light reflective layer material-dependent reflectance spectra and according to light absorbing layer compositions. In addition, since developed colors are thickness dependent, colors may vary depending on thicknesses even when having the same material composition.

By providing an electrochromic device on one surface of such a color developing layer, an active-type decoration element can be provided, and as a result, values of aesthetic perspectives different from existing passive-type decoration elements can be provided. Accordingly, various colors can be obtained in decoration elements of mobile phones, various mobile devices and electronic products.

In addition, when further comprising a color film, the breadth of obtainable colors can be further greatly increased even when materials and thicknesses of the light reflective layer and the light absorbing layer are determined. The breadth of color changes obtained by the color filter addition may be defined by a color difference ($\Delta E^*ab$), a difference in $L^*a^*b^*$ before and after applying the color filter. Furthermore, a plurality of colors can be developed by allowing the light absorbing layer to have two or more points or regions with different thicknesses on the same surface, and by forming a color developing layer on a three-dimensional pattern, various colors can be obtained in the three-dimensional pattern.

In addition, when an upper surface of the light absorbing layer has at least one inclined surface, changes in the developed colors can be obtained depending on a viewing angle, and the light absorbing layer can be prepared to have two or more regions with different thicknesses using a simple process.

BRIEF DESCRIPTION OF THE DRAWINGS

FIG. 1 illustrates a laminated structure of a decoration element according to one embodiment of the present disclosure.

FIG. 2 is a mimetic diagram for describing a working principle of color development in a light reflective layer and light absorbing layer structure.

FIG. 3 to FIG. 6 illustrate laminated structures of a decoration element according to alternative embodiments of the present disclosure.

FIG. 7 to FIG. 10 illustrate upper surface structures of a light absorbing layers of a decoration element according to alternative embodiments of the present application.

FIG. 11 to FIG. 14 illustrate laminated structures of a decoration element according to alternative embodiments of the present disclosure.

FIG. 15 to FIG. 17 are diagrams showing colors being developed differently depending on a thickness of a light absorbing layer.

FIG. 18 illustrates structures of a cathode-side electrochromic layer and an anode-side electrochromic layer.

FIG. 19 shows photographs observing colors of decoration elements prepared according to the Examples.

FIG. 20 shows simulation results of colors of decoration elements prepared in Examples 1 to 3 and Comparative Example 1.

FIG. 21 illustrates a laminated structure comprising a prism pattern structure of Example 4.

FIG. 22 shows simulation results of colors of a decoration element prepared in Example 4.

FIG. 23 is a diagram showing a method of discriminating a light absorbing layer and a light reflective layer.

DETAILED DESCRIPTION

Hereinafter, the present disclosure will be described in detail.

In the present specification, a "point" means one position that does not have an area. In the present specification, the expression is used to indicate that a light absorbing layer has two or more points with different thicknesses.

In the present specification, a "region" represents a part having a certain area. For example, when placing the decoration element on the ground so that a light reflective layer is placed at the bottom and the light absorbing layer is placed at the top and dividing both ends of the inclined surface or both ends with the same thickness perpendicular with respect to the ground, the region having an inclined surface means an area divided by the both ends of the inclined surface, and the region with the same thickness means an area divided by the both ends with the same thickness.

In the present specification, a "surface" or "region" may be a flat surface, but is not limited thereto, and a part or all may be a curved surface. For example, structures in which a vertical cross-section shape is a part of an arc of a circle or oval, a wave structure, a zigzag or the like may be included.

In the present specification, an "inclined surface" means, when placing the decoration member on the ground so that a light reflective layer is placed at the bottom and the light absorbing layer is placed at the top, a surface having an angle formed by the upper surface with respect to the ground of greater than 0 degrees and less than or equal to 90 degrees.

In the present specification, a "thickness" of a certain layer means a shortest distance from a lower surface to an upper surface of the corresponding layer.

In the present specification, "or" represents, unless defined otherwise, a case of selectively or all comprising those listed, that is, a meaning of "and/or".

In the present specification, a "layer" means covering 70% or more of an area where the corresponding layer is present. It means covering preferably 75% or more, and more preferably 80% or more. A decoration element according to one embodiment of the present application comprises a color developing layer comprising a light reflective layer, and a light absorbing layer provided on the light reflective layer; and an electrochromic device provided on one surface of the color developing layer.

In the present specification, resistance or surface resistance may be measured in accordance with a 4-point probe method using a known surface resistor. As for the surface resistance, a resistance value (V/I) is measured by measuring a current (I) and voltage (V) using 4 probes, and by using an area (unit area, W) of a sample and a distance (L) between electrodes for measuring resistance, surface resistance is obtained (V/I×W/L), and then, a resistive corrector factor (RCF) is multiplied thereby to calculate as ohm/square, a surface resistance unit. The resistive corrector factor may be calculated using a sample size, a sample thickness and a temperature at the time of measurement, and may be calculated using the Poisson's equation. Surface resistance of the whole laminate may be measured and calculated from the laminate itself, and surface resistance of each layer may be measured before forming layers formed with remaining materials other than a target layer to measure from the whole laminate, may be measured after removing layers formed with remaining materials other than a target layer to measure from the whole laminate, or may be measured by analyzing materials of a target layer and then forming a layer under the same condition as the target layer.

Electrochromicity is a phenomenon in which optical properties of an electrochromic active material change by an electrochemical oxidation-reduction reaction, and electrochromic materials reversibly change their optical properties, that is, colors and transmittance inherent to the materials, due to electron migration or oxidation-reduction reaction when a voltage is applied from the outside. An electrochromic device using such an electrochromic phenomenon largely includes, like a battery, an anode, a cathode and an electrolyte layer. An electrochromic layer is formed between the anode and the electrolyte, or between the cathode and the electrolyte, and when applying specific potential, ions such as $H^+$, $Li^+$ or $Na^+$ migrate in the electrolyte, and by electrons migrating through an external circuit at the same time, electron density of the electrochromic material changes resulting in changes in the optical properties. In other words, coloring or bleaching occurs on a metal oxide surface when electrons and ions are inserted and removed by an electrochemical oxidation-reduction reaction.

According to one embodiment, the electrochromic device comprises an anode, an anode-side electrochromic layer, an electrolyte layer, a cathode-side electrochromic layer and a cathode. These may be laminated in the above-mentioned order.

On a surface opposite to the surface adjoining the anode-side electrochromic layer of the anode, or on a surface opposite to the surface adjoining the cathode-side electrochromic layer of the cathode, a substrate may be further provided.

In one embodiment of the present specification, materials known in the art may be used as the substrate. Specifically, glass, plastic or the like may be used as the substrate, however, the substrate is not limited thereto.

In one embodiment of the present specification, a transparent substrate may be used as the substrate. In one embodiment, those materials having transmittance of 60% or higher in a visible region may be used as the substrate. In another embodiment, those materials having transmittance of 80% or higher in a visible region may be used as the substrate.

In one embodiment of the present specification, glass having transmittance of 80% or higher may be used as the substrate. The substrate thickness may be selected as necessary, and for example, may be in a range of 50 micrometers to 200 micrometers.

In one embodiment of the present specification, the anode and the cathode are not particularly limited as long as they are known in the art. In one embodiment, the anode and the cathode may each independently comprise indium doped tin oxide (ITO), antimony doped tin oxide (ATO), fluorine doped tin oxide (FTO), indium doped zinc oxide (IZO), ZnO and the like, but are not limited thereto.

In one embodiment of the present specification, the anode and the cathode may each be a transparent electrode. Specifically, ITO having transmittance of 80% or higher may be used.

In one embodiment of the present specification, the anode and the cathode each independently have a thickness of 10 nm to 500 nm, for example, 100 nm.

In one embodiment of the present specification, the anode-side electrochromic layer may be a Prussian blue film. The Prussian blue film comprises blue $MFeFe(CN)_6$ or colorless $M_2FeFe(CN)_6$. Herein, M is a monovalent alkali ion, for example, $H^+$, $Li^+$, $Na^+$ or $K^+$. It appears blue when colored, and colorless when bleached.

In one embodiment of the present specification, the anode-side electrochromic layer has a thickness of greater than or equal to 20 nm and less than or equal to 700 nm, for example, 300 nm to 400 nm.

In one embodiment of the present specification, the anode-side electrochromic layer has a refractive index of 1.8 to 2.9 at a wavelength of 550 nm.

In one embodiment of the present specification, the electrolyte layer may be prepared using materials and methods known in the art. Specifically, a pentaerythritol triacrylate (PETA) monomer, 1 M or higher $LiClO_4$, polycarbonate (PC) and the like may be used, however, the electrolyte layer is not limited thereto.

In one embodiment, the electrolyte layer may comprise a lithium salt, a plasticizer, an oligomer, a monomer, an additive, a radical initiator and the like. The oligomer used in the present disclosure needs to have compatibility with the plasticizer.

In one embodiment of the present specification, the electrolyte layer may be formed using a method of, for example, coating an electrolyte solution on a first release film, then bonding a second release film thereto, and UV curing the result to form an electrolyte film. The prepared electrolyte film may be bonded to the anode-side electrochromic layer and the cathode-side electrochromic layer after removing the first release film and the second release film from the electrolyte film.

As the first release film and the second release film, materials known in the art may be used.

The electrolyte solution may have viscosity of 10 cps to 100,000 cps, and 1,000 cps to 5,000 cps based on 25° C. When viscosity of the electrolyte solution satisfies the above-mentioned range, coating processability is excellent, and by preventing mixing process and defoaming process defects, film-type coating may be readily conducted.

In one embodiment of the present specification, thicknesses of the electrolyte layer may be each independently from 10 μm to 500 μm, for example, 50 μm to 100 μm.

In one embodiment of the present specification, the cathode-side electrochromic layer comprises an oxide comprising tungsten (W).

In one embodiment of the present specification, the cathode-side electrochromic layer comprises an oxide comprising tungsten (W), and may further comprise chromium (Cr), manganese (Mn), niobium (Nb) or the like.

In one embodiment of the present specification, the cathode-side electrochromic layer may comprise a thin film comprising an oxide comprising tungsten (W). In one embodiment, the thin film may have density of 1 $g/cm^3$ to 4 $g/cm^3$.

In one embodiment of the present specification, the oxide comprising tungsten (W) may be represented by a chemical formula of $WO_z$, and z is a real number of greater than or equal to 1 and less than or equal to 3.

In one embodiment, the oxide comprising tungsten (W) is tungsten trioxide ($WO_3$).

In one embodiment of the present specification, the cathode-side electrochromic layer has a thickness of greater than or equal to 10 nm and less than or equal to 1 μm, for example, 300 nm to 400 nm.

In one embodiment of the present specification, the cathode-side electrochromic layer may be formed using methods known in the art.

The anode-side electrochromic layer and the cathode-side electrochromic layer may each further comprise a metal bus bar at an edge thereof. A material of the metal bus bar may be formed with metals with high conductivity, and silver, copper, aluminum and the like may be used. A thickness of the metal bus bar may be set to be the same as the thickness of the electrochromic layer, and a width of the metal bus bar may be formed to 1 mm to 10 mm, however, the thickness and the width are not limited thereto.

FIG. 1 illustrates a laminated structure of a decoration element according to one embodiment of the present application. FIG. 1 illustrates a decoration element comprising a color developing layer (100) and an electrochromic device (200). The color developing layer (100) comprises a substrate (101), a light reflective layer (201) and a light absorbing layer (301). The electrochromic device (200) comprises a cathode (501), a cathode-side electrochromic layer (601), an electrolyte layer (701), an anode-side electrochromic layer (801), an anode (901) and a substrate (1001). FIG. 1 illustrates a structure in which the substrate (101) is provided on the light reflective layer (201) side of the color developing layer (100), however, the substrate (101) may not be included, or may be provided on a surface opposite to the surface adjoining the light absorbing layer (201) of the light reflective layer (301). In addition, FIG. 1 illustrates a structure in which the substrate (1001) is provided on the anode (901) side of the electrochromic device (200), however, an additional substrate may also be provided on the cathode (501) side, or the substrate (1001) may not be included. FIG. 1 illustrates a structure in which the cathode (501), the cathode-side electrochromic layer (601), the electrolyte layer (701), the anode-side electrochromic layer (801) and the anode (901) are consecutively laminated on the color developing layer, however, the structure is not limited thereto. For example, a structure in which the anode (901), the anode-side electrochromic layer (801), the electrolyte layer (701), the cathode-side electrochromic layer (601) and the cathode (501) are consecutively laminated on the color developing layer is also included in the scope of the present disclosure.

In FIG. 23, the light absorbing layer and the light reflective layer are illustrated. In the decoration element of FIG. 23, each layer is laminated in order of a $L_{i-1}$ layer, a $L_i$ layer and a $L_{i+1}$ layer based on a light entering direction, an interface $I_i$ is located between the $L_{i-1}$ layer and the $L_i$ layer, and an interface is located between the $L_i$ layer and the $L_{i+1}$ layer.

When irradiating light having a specific wavelength in a direction perpendicular to each layer so that thin film interference does not occur, reflectance at the interface $I_i$ may be expressed by the following Mathematical Equation 1.

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \qquad \text{[Mathematical Equation 1]}$$

In Mathematical Equation 1, $n_i(\lambda)$ means a refractive index depending on the wavelength ($\lambda$) of the $i^{th}$ layer, and $k_i(\lambda)$ means an extinction coefficient depending on the wavelength ($\lambda$) of the $i^{th}$ layer. The extinction coefficient is a measure capable of defining how strongly a subject material absorbs light at a specific wavelength, and the definition is as described above.

Using Mathematical Equation 1, when a sum of reflectance for each wavelength at the interface $I_i$ calculated at each wavelength is $R_i$, $R_i$ is calculated according to the following Mathematical Equation 2.

$$R_i = \frac{\sum_{\lambda=380\,nm}^{\lambda=780\,nm} \frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2}}{\sum_{\lambda=380\,nm}^{\lambda=780\,nm} \Delta\lambda} \qquad \text{[Mathematical Equation 2]}$$

Herein, when $R_i$ of $I_i$ is the largest among the interfaces of a laminate, a layer located adjoining the interface $I_i$, and facing the interface $I_i$ in a light entering direction may be defined as the light reflective layer, and the remaining layers may be defined as the light absorbing layer. For example, in the laminate illustrated in FIG. 23, when a sum of reflectance for each wavelength at the interface $I_{i+1}$ is the largest, the $L_{i+1}$ layer located adjoining the and facing the interface in a light entering direction may be defined as the light reflective layer, and the remaining $L_{i-1}$ layer and $L_i$ layer may be defined as the light absorbing layer.

FIG. 18 illustrates a structure in which a metal bus bar is provided at the edge of the anode-side electrochromic layer and the cathode-side electrochromic layer. In FIG. 18, a width and a height of the electrochromic layer are illustrated as 100 mm and 70 mm, respectively, however, this is just an example, and does not limit the scope of the present disclosure. For example, a width and a height of the electrochromic layer may be determined depending on the size of a finally required decoration element, and, for example, when the decoration element is intended to be used as a case for a mobile phone, the width and the height may be determined by the size of the mobile phone.

According to the embodiments, light absorption occurs in an entering path and a reflection path of light in the light absorbing layer, and by the light reflecting on each of a surface of the light absorbing layer and an interface of the light absorbing layer and the light reflective layer, the two reflections go through constructive or destructive interference. In the present specification, the light reflected on the surface of the light absorbing layer may be expressed as surface reflected light, and the light reflected on the interface of the light absorbing layer and the light reflective layer may be expressed as interface reflected light. A mimetic diagram of such a working principle is illustrated in FIG. 2. FIG. 2 illustrates a structure in which a substrate (101) is provided on a light reflective layer (201) side, however, the structure is not limited to such a structure, and as for the substrate (101) location, the substrate may be disposed on other locations as described above.

According to another embodiment of the present application, when the light absorbing layer comprises a pattern, the pattern may have a symmetric structure, an asymmetric structure or a combination thereof.

According to one embodiment, the light absorbing layer may comprise a symmetric-structured pattern. As the symmetric structure, a prism structure, a lenticular lens structure and the like are included.

According to another embodiment of the present application, the light absorbing layer may comprise an asymmetric-structured pattern.

In the present specification, the asymmetric-structured pattern means having an asymmetric structure on at least one surface when observing from an upper surface, a side surface or a cross-section. The decoration member may develop dichroism when having such an asymmetric structure. Dichroism means different colors being observed depending on a viewing angle.

Dichroism may be expressed by:

$$\Delta E^*ab = \sqrt{\{(\Delta L)^2 + (\Delta a)^2 + (\Delta b)^2\}}$$

With regard to the color difference described above, a viewing angle-dependent color difference being $\Delta E^*ab > 1$ may be defined as having dichroism.

The light absorbing layer may have dichroism of $\Delta E^*ab > 1$.

According to one embodiment, the light absorbing layer comprises a pattern in which an upper surface has a cone-shaped protrusion or groove. The cone shape comprises a shape of a circular cone, an oval cone or a polypyramid. Herein, the shape of the bottom surface of the polypyramid comprises a triangle, a square, a star shape having 5 or more protruding points, and the like. The cone shape may have a shape of a protrusion formed on an upper surface of the light absorbing layer, or a shape of a groove formed on an upper surface of the light absorbing layer. The protrusion has a triangular cross-section, and the groove has an inverted triangular cross-section. A lower surface of the light absorbing layer may also have the same shape as the upper surface of the light absorbing layer.

According to one embodiment, the cone-shaped pattern may have an asymmetric structure. For example, when rotating the cone-shaped pattern 360 degrees based on the vertex of the cone as observed from the upper surface, dichroism is difficult to be developed from the pattern when three or more of the same shapes are present. However, when rotating the cone-shaped pattern 360 degrees based on the vertex of the cone as observed from the upper surface, dichroism may be developed when two or less same shapes are present. FIG. 7 illustrates an upper surface of the cone shape, and (a) are illustrations of symmetric-structured cone shapes, and (b) are illustrations of asymmetric-structured cone shapes.

A symmetric-structured cone shape has a structure in which a cone-shaped bottom surface is a circle or a regular polygon having the same side lengths, and the vertex of the cone is present on a vertical line of the center of gravity of the bottom surface. However, an asymmetric-structured cone shape has a structure in which, when observing from the upper surface, the position of the vertex of the cone is present on a vertical line of a point that is not the center of gravity of the bottom surface, or has a structure in which the bottom surface is an asymmetric-structured polygon or oval. When the bottom surface is an asymmetric-structured polygon, at least one of the sides and the angles of the polygon may be designed to be different from the rest.

For example, as in FIG. 8, the position of the vertex of the cone may be changed. Specifically, when designing the vertex of the cone to be located on a vertical line of the center of gravity (O1) of the bottom surface when observing from the upper surface as in the first drawing of FIG. 8, 4 identical structures may be obtained when rotating 360 degrees based on the vertex of the cone (4-fold symmetry). However, the symmetric structure is broken by designing the vertex of the cone on a position (O2) that is not the center of gravity (O1) of the bottom surface. When employing a length of one side of the bottom surface as x, migration distances of the vertex of the cone as a and b, a height of the cone shape, a length of a line vertically connecting from the vertex of the cone (O1 or O2) to the bottom surface, as h, and an angle formed by the bottom surface and a side surface of the cone as θn, cosine values for Surface 1, Surface 2, Surface 3 and Surface 4 of FIG. 8 may be calculated as follows.

$$\cos(\Theta 1) = \frac{\left(\frac{x}{2}\right)}{sqrt\left(h^2 + \left(\frac{x}{2}\right)^2\right)}$$

$$\cos(\Theta 2) = \frac{\left(\frac{x}{2}\right)}{sqrt\left(h^2 + \left(\frac{x}{2}\right)^2\right)}$$

$$\cos(\Theta 3) = \frac{\left(\frac{x}{2} - a\right)}{sqrt\left(h^2 + \left(\frac{x}{2} - a\right)^2\right)}$$

$$\cos(\theta 4) = \frac{\left(\frac{x}{2} - b\right)}{sqrt\left(h^2 + \left(\frac{x}{2} - b\right)^2\right)}$$

Herein, θ1 and θ2 are the same, and therefore, there is no dichroism. However, θ3 and θ4 are different, and |θ3−θ4| means a color difference between two colors (E*ab), and therefore, dichroism may be obtained. Herein, |θ3−θ4|>0. As above, how much the symmetric structure is broken, that is, a degree of asymmetry, may be represented quantitatively using an angle formed by the bottom surface and a side surface of the cone, and the value representing such a degree of asymmetry is proportional to a color difference of dichroism.

According to another embodiment, the light absorbing layer comprises a pattern having a protrusion in which the highest point has a line shape or a groove in which the lowest point has a line shape. The line shape may be a straight-line shape or a curved-line shape, and may comprise both a curved line and a straight line. When rotating the pattern having a line-shaped protrusion or groove 360 degrees based on the center of gravity of an upper surface, as observed from the upper surface, dichroism is difficult to develop when two or more same shapes are present. However, when rotating the pattern having a line-shaped protrusion or groove 360 degrees based on the center of gravity of an upper surface, as observed from the upper surface, dichroism may be developed when only one same shape is present. FIG. 9 illustrates an upper surface of a pattern having a line-shaped protrusion, and (a) illustrates a pattern having a line-shaped protrusion developing no dichroism and (b) illustrates a pattern having a line-shaped protrusion developing dichroism. An X-X' cross-section of FIG. 9(a) is an isosceles triangle or an equilateral triangle, and a Y-Y' cross-section of FIG. 9(b) is a triangle having different side lengths.

According to another embodiment, the light absorbing layer comprises a pattern in which an upper surface has a protrusion or groove with a structure in which the cone-shaped upper surface is cut. Such a cross-section of the pattern may have a trapezoidal or inversed trapezoidal shape. In this case, dichroism may also be developed by designing the upper surface, the side surface or the cross-section to have an asymmetric structure.

In addition to the structure illustrated above, various protrusion or groove patterns as in FIG. 10 may be obtained.

According to another embodiment of the present application, the light absorbing layer may comprise two or more regions with different thicknesses.

Examples are illustrated in FIG. 3 and FIG. 4. FIG. 3 and FIG. 4 illustrate a structure in which a light reflective layer (201) and a light absorbing layer (301) are laminated. The decoration element of FIG. 3 and FIG. 4 may comprise a substrate, and the substrate (101) may be provided on the light reflective layer (201) side, or the substrate (101) may also be provided on the light absorbing layer (301) side. According to FIG. 3 and FIG. 4, the light absorbing layer (301) has two or more points or regions with different thicknesses. According to FIG. 3, thicknesses in the A region and the B region are different in the light absorbing layer (301). According to FIG. 4, thicknesses in the C region and the D region are different in the light absorbing layer (301).

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

Surface properties such as an upper surface slope of the light reflective layer may be the same as an upper surface of the light absorbing layer. For example, by using a deposition method when forming the light absorbing layer, the upper surface of the light absorbing layer may have the same slope as the upper surface of the light reflective layer.

FIG. 5 illustrates a structure of a decoration element having a light absorbing layer in which an upper surface has an inclined surface. The structure is a structure laminating a substrate (101), a light reflective layer (201) and a light absorbing layer (301), and thickness t1 in the E region and thickness t2 in the F region are different in the light absorbing layer (301).

FIG. 5 relates to a light absorbing layer having inclined surfaces facing each other, which is, having a structure with a triangle cross-section. In the structure of the pattern having inclined surfaces facing each other as in FIG. 5, a thickness of the light absorbing layer may be different in two surfaces of the triangle structure even when progressing deposition under the same condition. Accordingly, a light absorbing layer having two or more regions with different thicknesses may be formed using just one process. As a result, developed colors may become different depending on the thickness of the light absorbing layer. Herein, the thickness of the light reflective layer does not affect changes in the color when it is a certain thickness or greater.

FIG. 5 illustrates a structure in which the substrate (101) is provided on the light reflective layer (201) side, however, the structure is not limited thereto, and as described above, the substrate (101) may also be disposed on other locations. In addition, in FIG. 5, the surface adjoining the light reflective layer (201) of the substrate (101) is a flat surface, however, the surface adjoining the light reflective layer (201) of the substrate (101) may have a pattern having the same slope as an upper surface of the light reflective layer (201). This may cause a difference in the thickness of the light absorbing layer due to a difference in the slope of the pattern of the substrate. However, the present disclosure is not limited thereto, and even when the substrate and the light absorbing layer are prepared to have different slopes using different deposition methods, the dichroism described above may be obtained by having the thickness of the light absorbing layer being different on both sides of the pattern.

According to another embodiment of the present application, the light absorbing layer comprises one or more regions with a gradually changing thickness. FIG. 3 illustrates a structure in which a thickness of the light absorbing layer gradually changes.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes. FIG. 6 illustrates a structure of a light absorbing layer comprising a region in which an upper surface has an inclined surface. In FIG. 6, both the G region and the H region have a structure in which an upper surface of the light absorbing layer has an inclined surface, and a thickness of the light absorbing layer gradually changes.

According to one embodiment, the light absorbing layer comprises a first region having a first inclined surface with an inclined angle in a range of 1 degrees to 90 degrees, and may further comprise a second region in which an upper surface has an inclined surface with a different slope direction or a different inclined angle from the first inclined surface, or an upper surface is horizontal. Herein, thicknesses in the first region and the second region may be different from each other in the light absorbing layer.

According to another embodiment, the light absorbing layer comprises a first region having a first inclined surface with an inclined angle in a range of 1 degrees to 90 degrees, and may further comprise two or more regions in which an upper surface has an inclined surface with a different slope direction or a different inclined angle from the first inclined surface, or an upper surface is horizontal. Herein, thicknesses in the first region and the two or more regions may all be different from each other in the light absorbing layer.

According to another embodiment of the present application, the color developing layer comprises a color film provided on a surface of the light reflective layer opposite to the surface facing the light absorbing layer, between the light reflective layer and the light absorbing layer, or on a surface of the light absorbing layer opposite to the surface facing the light reflective layer.

When the color film is present compared to when the color film is not provided, the color film is not particularly limited as long as it has a color difference ΔE*ab, a distance in space of L*a*b* in a color coordinate CIE L*a*b* of the color developing layer, of greater than 1.

Colors may be expressed by CIE L*a*b*, and a color difference may be defined using a distance (ΔE*ab) in the L*a*b* space. Specifically, the color difference is:

$$\Delta E^*ab = \sqrt{\{(\Delta L)^2 + (\Delta a)^2 + (\Delta b)^2\}},$$

and within a range of 0<ΔE*ab<1, an observer may not recognize the color difference [reference document: Machine Graphics and Vision 20(4):383-411]. Accordingly, a color difference obtained by the color film addition may be defined by ΔE*ab>1 in the present specification.

FIG. 11 illustrates a color conversion layer comprising a color film, and FIG. 11(a) illustrates a structure in which a light reflective layer (201), a light absorbing layer (301) and a color film (401) are consecutively laminated, FIG. 11(b) illustrates a structure in which a light reflective layer (201), a color film (401) and a light absorbing layer (301) are consecutively laminated, and FIG. 11(c) illustrates a structure in which a color film (401), a light reflective layer (201) and a light absorbing layer (301) are consecutively laminated.

The color film may also perform the role of a substrate. For example, those materials that may be used as a substrate may be used as a color film by adding a pigment or a dye thereto.

The substrate may be provided on a surface of the light reflective layer opposite to the surface facing the light absorbing layer (FIG. 12(a)); or on a surface of the light absorbing layer opposite to the surface facing the light reflective layer (FIG. 12(b)).

For example, when the substrate is provided on a surface of the light reflective layer opposite to the surface facing the light absorbing layer, and the color film is located on a surface of the light reflective layer opposite to the surface facing the light absorbing layer, the color film may be provided between the substrate and the light reflective layer; or on a surface of the substrate opposite to the surface facing the light reflective layer. As another example, when the substrate is provided on a surface of the light absorbing layer opposite to the surface facing the light reflective layer, and the color film is located on a surface of the light absorbing layer opposite to the surface facing the light reflective layer, the color film may be provided between the substrate and the light absorbing layer; or on a surface of the substrate opposite to the surface facing the light absorbing layer.

According to another embodiment of the present application, the substrate is provided on a surface of the light reflective layer opposite to the surface facing the light absorbing layer, and the color film is further provided. FIG. 13(a) illustrates a structure in which the color film (401) is provided on a surface opposite to the light reflective layer (201) side of the light absorbing layer (301), FIG. 13(b) illustrates a structure in which the color film (401) is provided between the light absorbing layer (301) and the light reflective layer (201), FIG. 13(c) illustrates a structure in which the color film (401) is provided between the light reflective layer (201) and the substrate (101), and FIG. 13(d) illustrates a structure in which the color film (401) is provided on a surface opposite to the light reflective layer (201) side of the substrate (101). FIG. 13(e) illustrates a structure in which the color films (401a, 401b, 401c, 401d) are provided on a surface of the light absorbing layer (301) opposite to the light reflective layer (201) side, between the light absorbing layer (301) and the light reflective layer (201), between the light reflective layer (201) and the substrate (101), and on a surface of the substrate (101) opposite to the light reflective layer (201) side, respectively, however, the structure is not limited thereto, and 1 to 3 of the color films (401a, 401b, 401c, 401d) may not be included.

According to another embodiment of the present application, the substrate is provided on a surface of the light absorbing layer opposite to the surface facing the light reflective layer, and the color film is further provided. FIG. 14(a) illustrates a structure in which the color film (401) is provided on a surface of the substrate (101) opposite to the light absorbing layer (301) side, FIG. 14(b) illustrates a structure in which the color film (401) is provided between the substrate (101) and the light absorbing layer (301), FIG. 14(c) illustrates a structure in which the color film (401) is provided between the light absorbing layer (301) and the light reflective layer (201), and FIG. 14(d) illustrates a structure in which the color film (401) is provided on a surface of the light reflective layer (201) opposite to the light absorbing layer (301) side. FIG. 14(e) illustrates a structure in which the color films (401a, 401b, 401c, 401d) are provided on a surface of the substrate (101) opposite to the light absorbing layer (201), between the substrate (101) and the light absorbing layer (301), between the light absorbing layer (301) and the light reflective layer (201), and on a surface of the light reflective layer (201) opposite to the light absorbing layer (201), respectively, however, the structure is not limited thereto, and 1 to 3 of the color films (401a, 401b, 401c, 401d) may not be included.

In the structures such as FIG. 13(b) and FIG. 14(c), the light reflective layer may reflect light entering through the color film when the color film has visible light transmittance of greater than 0%, and therefore, colors may be obtained by laminating the light absorbing layer and the light reflective layer.

In the structures such as FIG. 13(c), FIG. 13(d) and FIG. 14(d), light transmittance of the colors developed from the color film of the light reflective layer (201) may be 1% or greater, preferably 3% or greater and more preferably 5% or greater, so that changes in the color difference obtained by the color film addition may be recognized. This is due to the fact that light transmitted in such a visible light transmittance range may be mixed with colors obtained by the color film.

The color film may be provided as one sheet, or as a laminate of 2 sheets or more that are the same or different types.

As the color film, those capable of developing target colors by combining with colors developed from the laminated structure of the light reflective layer and the light absorbing layer described above may be used. For example, color films expressing colors by one, two or more types of pigments and dyes being dispersed into a matrix resin may be used. Such a color film may be formed by directly coating a composition for forming a color film on a color film-providable location, or a method of preparing a color film by coating a composition for forming a color film on a separate substrate, or using a known molding method such as casting or extrusion, and then disposing or attaching the color film on a color film-providable location, may be used. As the coating method, wet coating or dry coating may be used.

The pigment and the dye capable of being included in the color film may be selected from among those capable of obtaining target colors from a final decoration member, and known in the art, and one, two or more types among pigments and dyes such as red-based, yellow-based, purple-based, blue-based or pink-based may be used. Specifically, dyes such as perinone-based red dyes, anthraquinone-based red dyes, methane-based yellow dyes, anthraquinone-based yellow dyes, anthraquinone-based purple dyes, phthalocyanine-based blue dyes, thioindigo-based pink dyes or isoxindigo-based pink dyes may be used either alone or as a combination. Pigments such as carbon black, copper phthalocyanine (C.I. Pigment Blue 15:3), C.I. Pigment Red 112, Pigment blue or isoindoline yellow may be used either alone or as a combination. As such dyes or pigments, those commercially available may be used, and for example, materials manufactured by Ciba ORACET or Chokwang Paint Ltd. may be used. Types of the dyes or pigments and colors thereof are for illustrative purposes only, and various known dyes or pigments may be used, and more diverse colors may be obtained therefrom.

As the matrix resin included in the color film, materials known as materials of transparent films, primer layers, adhesive layers or coating layers may be used, and the matrix resin is not particularly limited to these materials. For example, various materials such as acryl-based resins, polyethylene terephthalate-based resins, urethane-based resins, linear olefin-based resins, cycloolefin-based resins, epoxy-based resins or triacetylcellulose-based resins may be selected, and copolymers or mixtures of the materials illustrated above may also be used.

When the color film is disposed closer to the location of the observer of the decoration member than the light reflective layer or the light absorbing layer (as in, for example, the structures of FIGS. 13(a) and (b), and FIGS. 14(a), (b) and (c)), light transmittance of the colors developed by the color film from the light reflective layer, the light absorbing layer or the laminated structure of the light reflective layer and the light absorbing layer may be 1% or greater, preferably 3% or greater and more preferably 5% or greater. As a result, target colors may be obtained by combining colors developed from the color film and colors developed from the light reflective layer, the light absorbing layer or the laminated structure thereof.

The thickness of the color film is not particularly limited, and those skilled in the art may select and set the thickness as long as it is capable of obtaining target colors. For example, the color film may have a thickness of 500 nm to 1 mm.

The light absorbing layer may implement various colors depending on a refractive index (n), an extinction coefficient (k) and a thickness (t). FIG. 15 shows reflectance by wavelength depending on a thickness of the light absorbing layer, and FIG. 16 shows colors obtained therefrom. Specifically, FIG. 15 is a reflectance simulation graph by CuO deposition thickness of CuO/Cu, and is a material prepared while varying a CuO thickness from 10 nm to 60 nm under the same deposition condition.

FIG. 17 shows a simulation result indicating that different colors are observed depending on a viewing angle. FIG. 17 is a simulation result of CuON/Al. In FIG. 17, the thickness of the light absorbing layer increases from 10 nm to 100 nm by 10 nm, and an incident angle is adjusted from 0 degrees to 60 degrees at a 15 degrees interval. Through such a simulation result, it is seen that, in the structure according to an embodiment of the present application, various colors may be obtained by adjusting a thickness of a light absorbing layer and an inclined angle of an upper surface. By being provided with a color film in addition thereto, more diverse colors may be obtained.

In FIG. 17, L*a*b* coordinate values of a1 to a5 are each (91, 3, 5), L*a*b* coordinate values of b1 to b5 are (74, 14, 8), (74, 14, 8), (72, 15, 10), (69, 15, 11) and (66, 16, 13), respectively, L*a*b* coordinate values of c1 to c5 are (46, 22, −11), (45, 22, −10), (43, 25, −9), (40, 28, −4) and (42, 30, 6), respectively, L*a*b* coordinate values of d1 to d5 are (36, −12, −22), (35, −11, −23), (30, −7, −24), (20, 6, −26) and (18, 38, −12), respectively, L*a*b* coordinate values of e1 to e5 are (49, −20, −7), (48, −20, −7), (43, −20, −8), (34, −18, 39) and (18, 7, −10), respectively, L*a*b* coordinate values of f1 to f5 are (60, −10, 4), (59, −10, 4), (55, −11, 4), (47, −11, 4) and (31, −4, 3), respectively, L*a*b* coordinate values of g1 to g5 are (66, −4, 10), (65, −4, 10), (62, −4, 10), (54, −5, 11) and (40, −2, 10), respectively, L*a*b* coordinate values of h1 to h5 are (69, 1, 11), (68, 1, 12), (64, 1, 13), (58, 1, 14) and (44, 2, 13), respectively, L*a*b* coordinate values of i1 to i5 are (68, 5, 11), (67, 5, 11), (64, 5, 12), (58, 6, 14) and (41, 7, 14), respectively, and L*a*b* coordinate values of j1 to j5 are (66, 8, 8), (65, 8, 8), (62, 8, 10), (56, 9, 11) and (43, 11, 11), respectively.

The light reflective layer is not particularly limited as long as it is a material capable of reflecting light, however, light reflectance may be determined depending on the material, and for example, colors are readily expressed at 50% or greater. Light reflectance may be measured using an ellipsometer.

The light absorbing layer preferably has a refractive index (n) of 0 to 8 at 400 nm, and the refractive index may be from 0 to 7, may be from 0.01 to 3, and may be from 2 to 2.5. The refractive index (n) may be calculated by sin θ1/sin θ2 (θ1 is an angle of light incident on a surface of the light absorbing layer, and θ2 is a refraction angle of light inside the light absorbing layer).

The light absorbing layer preferably has a refractive index (n) of 0 to 8 at 380 nm to 780 nm, and the refractive index may be from 0 to 7, may be from 0.01 to 3, and may be from 2 to 2.5.

The light absorbing layer may have an extinction coefficient (k) of greater than 0 and less than or equal to 4 at 400 nm, and the extinction coefficient (k) is preferably from 0.01 to 4, may be from 0.01 to 3.5, may be from 0.01 to 3, and may be from 0.1 to 1. The extinction coefficient (k) is $-\lambda/4\pi I$ (dI/dx) (herein, a value multiplying $\lambda/4\pi$ with dI/I, a reduced fraction of light intensity per a path unit length (dx), for example 1 m, in the light absorbing layer, and herein, $\lambda$ is a wavelength of light).

The light absorbing layer may have an extinction coefficient (k) of greater than 0 and less than or equal to 4 at 380 nm to 780 nm, and the extinction coefficient (k) is preferably from 0.01 to 4, may be from 0.01 to 3.5, may be from 0.01 to 3, and may be from 0.1 to 1.

The extinction coefficient (k) is in the above-mentioned range at 400 nm, preferably in the whole visible wavelength region of 380 nm to 780 nm, and therefore, a role of the light absorbing layer may be performed in the visible range.

For example, using a method of absorbing light by adding a dye to a resin, and using a material having an extinction coefficient as described above lead to different light absorption spectra. When absorbing light by adding a dye to a resin, an absorption wavelength band is fixed, and only a phenomenon of varying an absorption amount depending on the changes in the coating thickness occurs. In addition, in order to obtain a target light absorption amount, changes in the thickness of at least a few micrometers or more are required to adjust the light absorption amount. On the other hand, in materials having an extinction coefficient, a wavelength band absorbing light changes even when the thickness changes by a several to tens of nanometer scale.

According to one embodiment, the light reflective layer may be a metal layer, a metal oxide layer, a metal nitride layer, a metal oxynitride layer or an inorganic material layer. The light reflective layer may be formed in a single layer, or may be formed in a multilayer of two or more layers.

As one example, the light reflective layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof, and one, two or more types of materials among carbon and carbon composites. For example, the light reflective layer may comprise two or more alloys selected from among the above-mentioned materials, or oxides, nitrides or oxynitrides thereof. According to another embodiment, the light reflective layer may allow highly resistant reflective layer by being prepared using an ink comprising carbon or carbon composites. Carbon black, CNT and the like may be included as the carbon or carbon composites. The ink comprising carbon or carbon composites may comprise above-described materials, or oxides, nitrides or oxynitrides thereof, and for example, one, two or more types of oxides selected from among indium (In), titanium (Ti), tin (Sn), silicon (Si), germanium (Ge). aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag) may be included. A curing process may be further carried out after printing the ink comprising carbon or carbon composites.

When the light reflective layer comprises two or more types of materials, the two or more types of materials may be formed using one process, for example, a method of deposition or printing, however, a method of first forming a layer using one or more types of materials, and then additionally forming a layer thereon using one or more types of materials may be used. For example, a light reflective layer may be formed by forming a layer through depositing indium or tin, then printing an ink comprising carbon, and then curing the result. The ink may further comprise oxides such as titanium oxides or silicon oxides.

According to one embodiment, the light absorbing layer may be a single layer, or a multilayer of two or more layers.

The light absorbing layer may be formed with materials having an extinction coefficient (k) at 400 nm, preferably at 380 nm to 780 nm, that is, materials having an extinction coefficient of greater than 0 and less than or equal to 4, preferably 0.01 to 4. For example, the light absorbing layer may comprise one, two or more selected from the group consisting of metals, metalloids, and oxides, nitrides, oxynitrides and carbides of metals or metalloids. The oxides, nitrides, oxynitrides or carbides of metals or metalloids may be formed under a deposition condition and the like set by those skilled in the art. The light absorbing layer may also comprise the same metals, metalloids, alloys or oxynitrides of two or more types as the light reflective layer.

For example, the light absorbing layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof. As specific examples, the light absorbing layer comprises one, two or more types selected from among copper oxides, copper nitrides, copper oxynitrides, aluminum oxides, aluminum nitrides, aluminum oxynitrides and molybdenum titanium oxynitrides.

According to one embodiment, the light absorbing layer comprises silicon (Si) or germanium (Ge).

The light absorbing layer formed with silicon (Si) or germanium (Ge) may have a refractive index (n) of 0 to 8, or 0 to 7 at 400 nm, and may have an extinction coefficient (k) of greater than 0 and less than or equal to 4, preferably 0.01 to 4, and the extinction coefficient (k) may be from 0.01 to 3 or from 0.01 to 1.

According to another embodiment, the light absorbing layer comprises one, two or more types selected from among copper oxides, copper nitrides, copper oxynitrides, aluminum oxides, aluminum nitrides, aluminum oxynitrides and molybdenum titanium oxynitrides. In this case, the light absorbing layer may have a refractive index (n) of 1 to 3, for example, 2 to 2.5 at 400 nm, and an extinction coefficient (k) of greater than 0 and less than or equal to 4, preferably 0.01 to 2.5, preferably 0.2 to 2.5 and more preferably 0.2 to 0.6.

According to one embodiment, the light absorbing layer is AlOxNy (x>0, y>0).

According to another embodiment, the light absorbing layer may be AlOxNy (0≤x≤1.5, 0≤y≤1).

According to another embodiment, the light absorbing layer is AlOxNy (x>0, y>0), and with respect to the total number of atoms 100%, the number of each atom satisfies the following equation.

$$1 < \frac{(Al)at \times 3}{(O)at \times 2 + (N)at \times 3} < 2$$

According to one embodiment, the light absorbing layer may be formed with materials having an extinction coefficient (k) at 400 nm, preferably at 380 to 780 nm, and for example, the light absorbing layer/light reflective layer may be formed with materials such as CuO/Cu, CuON/Cu, CuON/Al, AlON/Al, AlN/AL/AlON/Cu or AlN/Cu.

According to one embodiment, the thickness of the light reflective layer may be determined depending on target color in a final structure, and for example, may be 1 nm or greater, preferably 25 nm or greater, for example, 50 nm or greater, and preferably 70 nm or greater.

According to one embodiment, the thickness of the light absorbing layer may be from 5 nm to 500 nm, for example, from 30 nm to 500 nm.

According to one embodiment, a difference in the thickness by the region of the light absorbing layer is from 2 nm to 200 nm, and may be determined depending on a target color difference.

According to one embodiment, a substrate provided on a lower surface of the light reflective layer or an upper surface of the light absorbing layer may be further included. Surface properties such as an upper surface slope of the substrate may be the same as upper surfaces of the light reflective layer and the light absorbing layer. By forming the light reflective layer and the light absorbing layer using a deposition method, the substrate, the light reflective layer and the light absorbing layer may have an inclined surface with the same angle. For example, the structure as above may be obtained by forming an inclined surface or a three-dimensional structure on an upper surface of a substrate, and depositing a light reflective layer and a light absorbing layer thereon in this order, or depositing a light absorbing layer and a light reflective layer in this order.

According to one embodiment, forming an inclined surface or a three-dimensional structure on the substrate surface may be carried out using a method of forming a pattern on an ultraviolet curable resin and curing the result using ultraviolet rays, or processing with laser. According to one embodiment, the decoration element may be a deco film or a case of a mobile device. The decoration element may further comprise a gluing layer as necessary.

Materials of the substrate are not particularly limited, and ultraviolet curable resins known in the art may be used when forming an inclined surface or a three-dimensional structure using methods as above.

On the light absorbing layer, a protective layer may be further provided.

According to one embodiment, an adhesive layer may be further provided on an opposite surface of the substrate provided with the light absorbing layer or the light reflective layer. This adhesive layer may be an optically clear adhesive (OCA) layer. As necessary, a peel-off layer (release liner) may be further provided on the adhesive layer for protection.

Deposition such as a sputtering method has been described as an example of forming the light reflective layer and the light absorbing layer in the present specification, however, various methods of preparing a thin film may be used as long as constitutions and properties according to embodiments described in the present specification are obtained. For example, a vapor deposition method, a chemical vapor deposition (CVD) method, wet coating and the like may be used.

EXAMPLES

Hereinafter, the present disclosure will be described in more detail with reference to examples. However, the following examples are for illustrative purposes only, and are not to limit the scope of the present disclosure.

Example 1

A film in which an ITO layer having a thickness of 80 nm and a $WO_3$ layer having a thickness of 250 nm are consecutively laminated on one surface of a PET substrate was prepared. On the opposite surface of the PET substrate, a light reflective layer (Al, thickness 100 nm) and a light absorbing layer (aluminum oxynitride, thickness 40 nm) were deposited so that the basic color becomes gold when bleached. The half-cell manufactured as above was placed in a bath comprising an electrolyte liquid ($LiClO_4$ (1 M)+propylene carbonate (PC)), a potentiostat device was prepared, and a voltage of −1 V was applied for 50 seconds to color $WO_3$.

With a gel polymer electrolyte (GPE) as a medium, the film comprising the ITO layer and the $WO_3$ layer of the half-cell was bonded with a Prussian blue (PB)/ITO laminate to prepare a film having a laminated structure of Al/AlON/ITO/$WO_3$/GPE/PB/ITO.

A rate of color change was measured while repeatedly applying a bleaching voltage and a coloring voltage to the prepared film at a constant cycle. The bleaching voltage and the coloring voltage per one cycle were each applied for 50 seconds at a magnitude of (±)1.2 V.

Example 2

A film in which an ITO layer having a thickness of 80 nm and a $WO_3$ layer having a thickness of 250 nm are consecutively laminated on one surface of a PET substrate was prepared. On the opposite surface of the PET substrate, a light reflective layer (Al, thickness 100 nm) and a light absorbing layer (aluminum oxynitride, thickness 60 nm) were deposited so that the basic color becomes gold when bleached. The half-cell manufactured as above was placed in a bath comprising an electrolyte liquid ($LiClO_4$ (1 M)+propylene carbonate (PC)), a potentiostat device was prepared, and a voltage of −1 V was applied for 50 seconds to color $WO_3$.

With a gel polymer electrolyte (GPE) as a medium, the film comprising the ITO layer and the $WO_3$ layer of the half-cell was bonded with a Prussian blue (PB)/ITO laminate to prepare a film having a laminated structure of Al/AlON/ITO/$WO_3$/GPE/PB/ITO.

A rate of color change was measured while repeatedly applying a bleaching voltage and a coloring voltage to the prepared film at a constant cycle. The bleaching voltage and the coloring voltage per one cycle were each applied for 50 seconds at a magnitude of (±)1.2 V.

Example 3

A film in which an ITO layer having a thickness of 80 nm and a $WO_3$ layer having a thickness of 250 nm are consecutively laminated on one surface of a PET substrate was prepared. On the opposite surface of the PET substrate, a light reflective layer (Al, thickness 100 nm) and a light absorbing layer (aluminum oxynitride, thickness 80 nm) were deposited so that the basic color becomes gold when bleached. The half-cell manufactured as above was placed in a bath comprising an electrolyte liquid ($LiClO_4$ (1 M)+propylene carbonate (PC)), a potentiostat device was prepared, and a voltage of −1 V was applied for 50 seconds to color $WO_3$.

With a gel polymer electrolyte (GPE) as a medium, the film comprising the ITO layer and the $WO_3$ layer of the half-cell was bonded with a Prussian blue (PB)/ITO laminate to prepare a film having a laminated structure of Al/AlON/ITO/$WO_3$/GPE/PB/ITO.

A rate of color change was measured while repeatedly applying a bleaching voltage and a coloring voltage to the prepared film at a constant cycle. The bleaching voltage and the coloring voltage per one cycle were each applied for 50 seconds at a magnitude of (±)1.2 V.

Comparative Example 1

Without forming the light reflective layer and the light absorbing layer of Example 1, ITO having a thickness of 210 nm and a $WO_3$ layer having a thickness of 250 nm were consecutively laminated on a PET substrate. After that, a transmissive electrochromic film (ITO/$WO_3$/GPE/PB/ITO) was prepared through the same lamination process as in Example 1. A rate of color change was measured on the film prepared as above in the same manner as in Example 1.

Resistance, coloring time and bleaching time of the films prepared in Examples 1 and 2 and Comparative Example 1 are shown in the following Table 1.

TABLE 1

| | Resistance (Ω/square) | Coloring Time (sec) | Bleaching Time (sec) |
|---|---|---|---|
| Example 1 | 30 | 32 | 31 |
| Example 2 | 30 | 31 | 30 |
| Example 3 | 30 | 32 | 30 |
| Comparative Example 1 | 30 | 30 | 32 |

[ITO resistance used in Examples 1, 2 and 3 was all the same as 30 ohm/square]

Color changes over time when applying a coloring voltage to the film prepared in Example 1, and color changes over time when applying a bleaching voltage thereto are shown in FIG. 19. According to FIG. 19, it was identified that various colors were obtained with the voltage application, or with the passage of time after the voltage application. Each number in FIG. 19 represents CIE L*ab coordinate values of the corresponding color.

Results of simulating the colors observed while the decoration elements prepared in Comparative Example 1 and Examples 1 to 3 were bleached are shown in FIG. 20. Herein, the simulation results were obtained assuming that the thickness of the light absorbing layer (aluminum oxynitride layer) was 20 nm in Example 1, 30 nm and 40 nm in Example 2, and 50 nm and 60 nm in Example 3. As illustrated in FIG. 20, various colors may be obtained depending on the thicknesses.

Example 4

Preparation was made in the same manner as in Example 1 except that, as the PET substrate, a PET film having a prism pattern formed on a surface opposite to the surface adjoining the electrochromic device as in FIG. 21 was used, and the light reflective layer and the light absorbing layer were formed on the surface provided with the prism pattern of the PET film. In addition, a PET film was further laminated as an anode after forming the ITO layer. The size of the prepared decoration element on one surface was 70 mm×100 mm as in FIG. 18.

An electrochromic rate is affected by resistance of electrochromic material and ITO, and therefore, the same results were obtained as in Example 1. In the bleached state, results of simulating the colors observed from the light reflective layer side and the light absorbing layer side provided on the prism pattern of the PET film PET are shown in FIG. 22. Right, down, left and up of FIG. 22 represent obtained colors when looking the laminated structure of FIG. 21 from the right, from the below, from the left and from the above, respectively, in FIG. 21.

In the experiments, resistance and time for color change were measured using the methods as follows.

Resistance: surface resistance of each of the films prepared in the examples and the preparation examples was measured in accordance with a 4-point probe method using a known surface resistor. Surface resistance of Table 1 was measured for the light reflective layer before forming the light absorbing layer in the examples, and for the ITO in the comparative example. Surface resistance of the whole laminate is determined by resistance of the reflective layer having low surface resistance since the layers are connected in parallel. The surface resistance was measured using a measuring device of Hiresta MCP-HT450, ASP PROBE.

Time for color change: as for the coloring time, time taken to reach approximately 20% of the transmittance of a final colored state observed after time to apply potential for coloring (50 s) had passed was measured.

In addition, as for the bleaching time, time taken to reach approximately 80% of the transmittance of a final bleached state observed after time to apply potential for bleaching (50 s) had passed was measured.

The invention claimed is:

1. A decoration element comprising:
a color developing layer comprising a light reflective layer, and a light absorbing layer provided on the light reflective layer; and
an electrochromic device provided on one surface of the color developing layer.

2. The decoration element of claim 1, wherein the color developing layer further comprises a color film provided on a surface of the light reflective layer opposite to the surface facing the light absorbing layer, between the light reflective layer and the light absorbing layer, or on a surface of the light absorbing layer opposite to the surface facing the light reflective layer.

3. The decoration element of claim 1, wherein the color developing layer further comprises a substrate provided on a surface of the light reflective layer opposite to the surface facing the light absorbing layer, or on a surface of the light absorbing layer opposite to the surface facing the light reflective layer.

4. The decoration element of claim 1, wherein the electrochromic device comprises an anode, an anode-side electrochromic layer, an electrolyte layer, a cathode-side electrochromic layer and a cathode.

5. The decoration element of claim 1, wherein the electrochromic device further comprises a substrate provided on a surface of the anode opposite to the surface adjoining the anode-side electrochromic layer, or on a surface of the cathode opposite to the surface adjoining the cathode-side electrochromic layer.

6. The decoration element of claim 1, wherein the light absorbing layer comprises two or more points with different thicknesses.

7. The decoration element of claim 1, wherein the light absorbing layer comprises one or more regions in which an upper surface comprises an incline surface with an inclined angle of greater than 0 degrees and less than or equal to 90 degrees, and the light absorbing layer comprises one or more regions having a thickness different from a thickness in any one region having the inclined surface.

8. The decoration element of claim 1, wherein the light absorbing layer has dichroism of $\Delta E^*ab > 1$.

9. The decoration element of claim 1, wherein an upper surface of the light absorbing layer comprises a pattern having a cone-shaped protrusion or groove, a pattern having a protrusion in which the highest point has a line shape or a groove in which the lowest point has a line shape, or a pattern having a protrusion or groove with a structure in which the cone-shaped upper surface is cut.

10. The decoration element of claim 9, wherein, in the pattern having a cone-shaped protrusion or groove, two or fewer of the same shapes are present when rotating the cone-shaped pattern 360 degrees based on the vertex of the cone and observing from the upper surface.

11. The decoration element of claim 9, wherein, in the pattern having a protrusion in which the highest point has a line shape or a groove in which the lowest point has a line shape, only one same shape is present when rotating 360 degrees based on the center of gravity of the upper surface and observing from the upper surface.

12. The decoration element of claim 1, wherein the light absorbing layer has a refractive index of 0 to 8 at 400 nm.

13. The decoration element of claim 1, wherein the light absorbing layer has an extinction coefficient of greater than 0 and less than or equal to 4 at 400 nm.

14. The decoration element of claim 1, which is a deco film or a case of a mobile device.

* * * * *